(12) United States Patent
Lam et al.

(10) Patent No.: US 9,128,248 B2
(45) Date of Patent: Sep. 8, 2015

(54) OPTICAL TRANSCEIVER INTERFACE WITH C-SHAPED PLANAR ALIGNMENT AND SECURING

(75) Inventors: Chun Chit Lam, Santa Clara, CA (US); Jamyuen Ko, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,466

(22) PCT Filed: Nov. 23, 2011

(86) PCT No.: PCT/US2011/062092
§ 371 (c)(1),
(2), (4) Date: Jun. 18, 2013

(87) PCT Pub. No.: WO2013/077879
PCT Pub. Date: May 30, 2013

(65) Prior Publication Data
US 2013/0279853 A1        Oct. 24, 2013

(51) Int. Cl.
*G02B 6/32*       (2006.01)
*G02B 6/42*       (2006.01)

(52) U.S. Cl.
CPC .............. *G02B 6/32* (2013.01); *G02B 6/4204* (2013.01); *G02B 6/428* (2013.01); *G02B 6/4249* (2013.01); *G02B 6/4284* (2013.01); *G02B 6/4292* (2013.01)

(58) Field of Classification Search
CPC ... G02B 6/4219; G02B 6/4226; G02B 6/4292
USPC ....................................................... 385/79, 93
See application file for complete search history.

(56) References Cited

U.S. PATENT DOCUMENTS

| | | | |
|---|---|---|---|
| 6,095,697 A | 8/2000 | Lehman et al. | |
| 6,634,797 B2 * | 10/2003 | Yang et al. | 385/59 |
| 8,235,601 B2 * | 8/2012 | Chang et al. | 385/74 |
| 8,256,972 B2 * | 9/2012 | Wu | 385/93 |
| 2004/0105626 A1 * | 6/2004 | Gallup et al. | 385/88 |
| 2008/0232737 A1 * | 9/2008 | Ishigami et al. | 385/14 |
| 2011/0101255 A1 * | 5/2011 | Tamura et al. | 250/551 |
| 2011/0116746 A1 * | 5/2011 | Chen | 385/74 |

(Continued)

FOREIGN PATENT DOCUMENTS

| | | |
|---|---|---|
| CN | 102062903 | 5/2011 |
| KR | 10-2000-31072 | 10/2002 |
| TW | 201115195 | 5/2011 |

OTHER PUBLICATIONS

International Search Report and Written Opinion from PCT/US2011/062092 mailed May 31, 2012, 9 pages.

(Continued)

*Primary Examiner* — Charlie Y Peng
(74) *Attorney, Agent, or Firm* — Blakely, Sokoloff, Taylor & Zafman LLP

(57) ABSTRACT

An optical lens connector includes alignment features for passive connection alignment. The alignment features are C-shaped and have generally planar surfaces to interface with a mating connector. The alignment features passively align an optical fiber with an optical lens in the optical lens connector, by fitting adjacent to planar surfaces of the mating connector. When interfaced together, the alignment features restrict lateral and vertical motion of the connectors with respect to each other, which helps keep the optical lens aligned with the optical fiber.

17 Claims, 6 Drawing Sheets

(56) References Cited

U.S. PATENT DOCUMENTS

| | | | | |
|---|---|---|---|---|
| 2011/0222823 | A1* | 9/2011 | Pitwon | 385/93 |
| 2012/0148202 | A1* | 6/2012 | Banal et al. | 385/93 |
| 2012/0189252 | A1* | 7/2012 | Bhagavatula et al. | 385/79 |
| 2013/0343698 | A1* | 12/2013 | Ko | 385/14 |
| 2014/0105543 | A1* | 4/2014 | de Jong | 385/77 |
| 2014/0169744 | A1* | 6/2014 | Kuo | 385/74 |
| 2014/0185990 | A1* | 7/2014 | Hodge et al. | 385/79 |

OTHER PUBLICATIONS

International Preliminary Report on Patentability for International Application No. PCT/US2011/062092, mailed Jun. 5, 2014, 6 pages.
"Office Action for Taiwan Patent Application No. 101141552", (Dec. 26, 2014), Whole Document.

* cited by examiner

OPTICAL TRANSCEIVER INTERFACE WITH C-SHAPED PLANAR ALIGNMENT AND SECURING

This application is a U.S. National Phase application under 35 U.S.C. §371 and claims priority to International Application No. PCT/US11/62092 filed Nov. 23, 2011.

FIELD

Embodiments of the invention are generally related to optical interconnects, and more particularly to an optical interconnect lens with alignment features.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2011, Intel Corporation, All Rights Reserved.

BACKGROUND

Current computer platform architecture design encompasses many different interfaces to connect one device to another device. The interfaces provide I/O (input/output) for computing devices and peripherals, and may use a variety of protocols and standards to provide the I/O. The differing interfaces may also use different hardware structures to provide the interface. For example, current computer systems typically include multiple ports with corresponding connection interfaces, as implemented by physical connectors and plugs at the ends of the cables connecting the devices. Common connector types can include a Universal Serial Bus (USB) subsystem with a number of associated USB plug interfaces, DisplayPort, MiniDisplayPort (MDP), High Definition Multimedia Interface (HDMI), Firewire (as set forth in IEEE 1394), or other connector type.

Increased throughput on interconnects is generally considered desirable. While optical signals are known to have high bandwidth data transfer, implementing optical signal interconnecting introduces challenges in the small form factors and plug-and-unplug environments of computing devices. Additionally, issues related to form factor or backwards compatibility with existing devices may reduce the ability to use optical signals in existing architectures. Furthermore, optical signals may degrade due to repeated use causing loosening of connectors. Thus, optical signal transfer may degrade by normal use of a connector and corresponding interface port, reducing the effectiveness of the interface.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, an optical connector assembly includes an optical lens connector and a jumper connector. The optical lens connector includes C-shaped generally planar alignment features for passive connection alignment. Thus, the alignment features have generally planar surfaces and a general C-shape to interface with the jumper connector. The jumper connector has mating planar alignment surfaces that fit adjacent to the C-shaped planar surfaces of the optical lens connector. The alignment features passively align an optical fiber of the jumper connector with an optical lens of the optical lens connector. When the connectors are interfaced together, the C-shapes of the alignment features hold the mating elements of the jumper connector to restrict lateral and vertical motion of the connectors with respect to each other, which helps keep the optical lens aligned with the optical fiber. In one embodiment, a latch holds the jumper connector to the optical lens connector, reinforcing and securing the interconnection.

In one embodiment, the C-shaped alignment features can be referred to as stubs of the optical lens connector, disposed on the perimeter, and extending from the lens body. In one embodiment, the C-shaped alignment features are part of the jumper connector, and the optical lens connector includes mating surfaces and spaces to interface with the C-shaped alignment features of the jumper connector. The C-shaped alignment structures are disposed on a perimeter of the surface of the lens body and are in the same plane as the surface of the lens body. Each of the C-shaped alignment structures surrounding a substantially rectangular space in the plane on only three sides. While the C-shaped alignment features could be referred to as stubs, the mating stop surface that interfaces in the center of the C-shape could also be referred to as a stub.

Figure 1A:
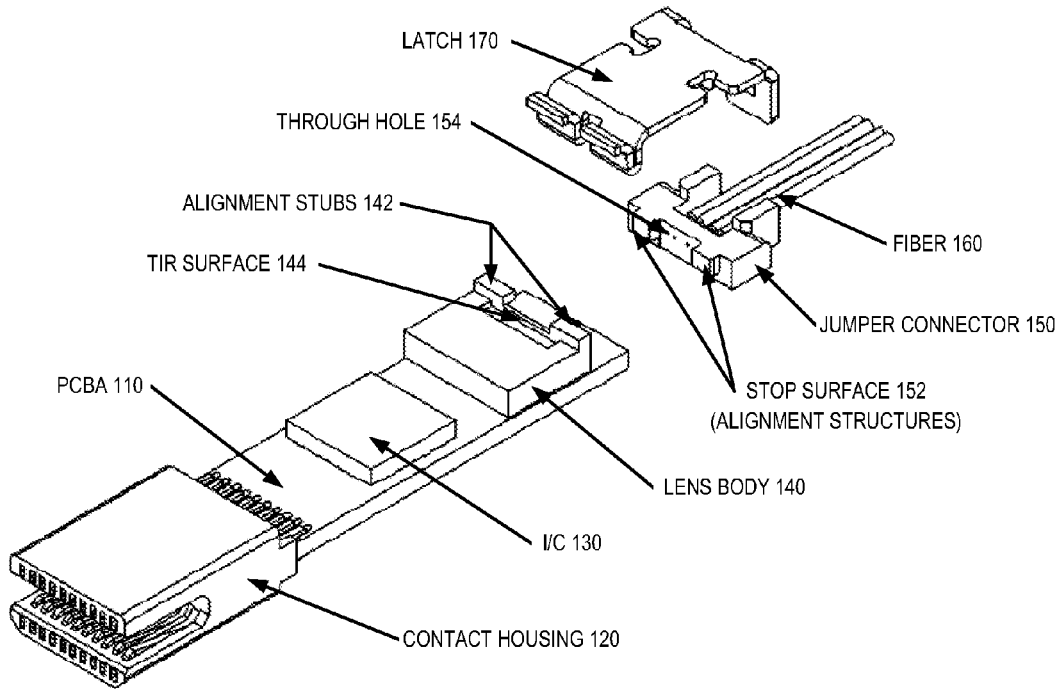
FIGS. 1A-1F illustrate block diagrams of an embodiment of a plug assembly with an optical lens connector and a fiber jumper connector having c-shaped planar interface surfaces, and a latch.
Figure 1B:
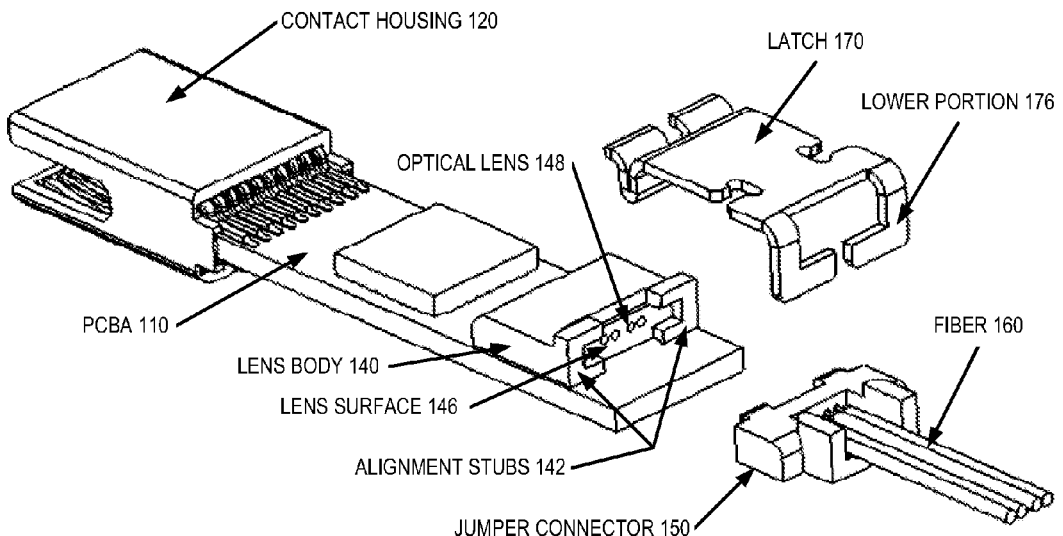
Figure 1C:
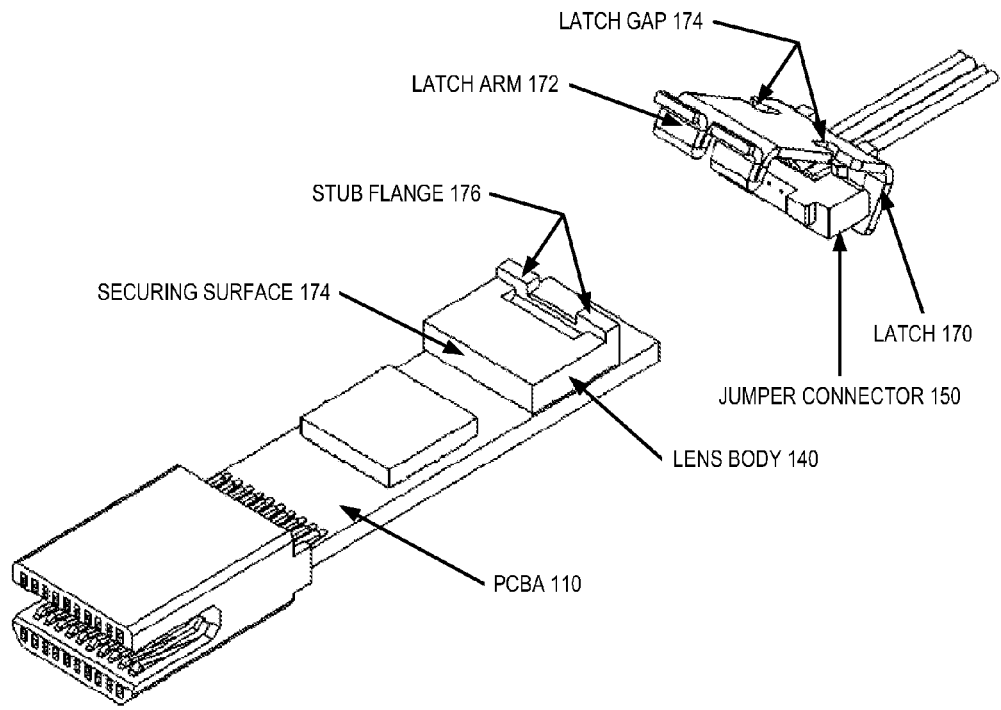
Figure 1D:
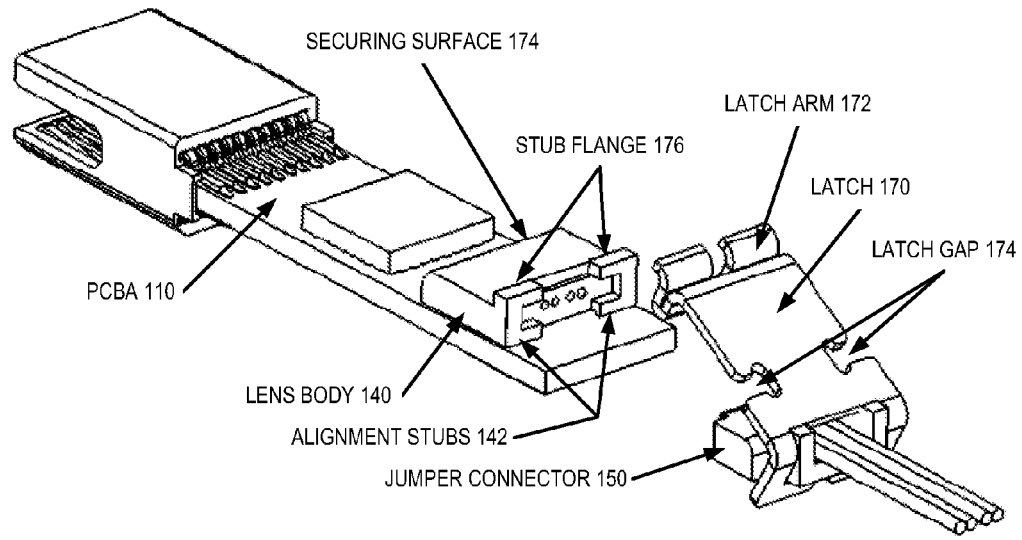
Figure 1E:
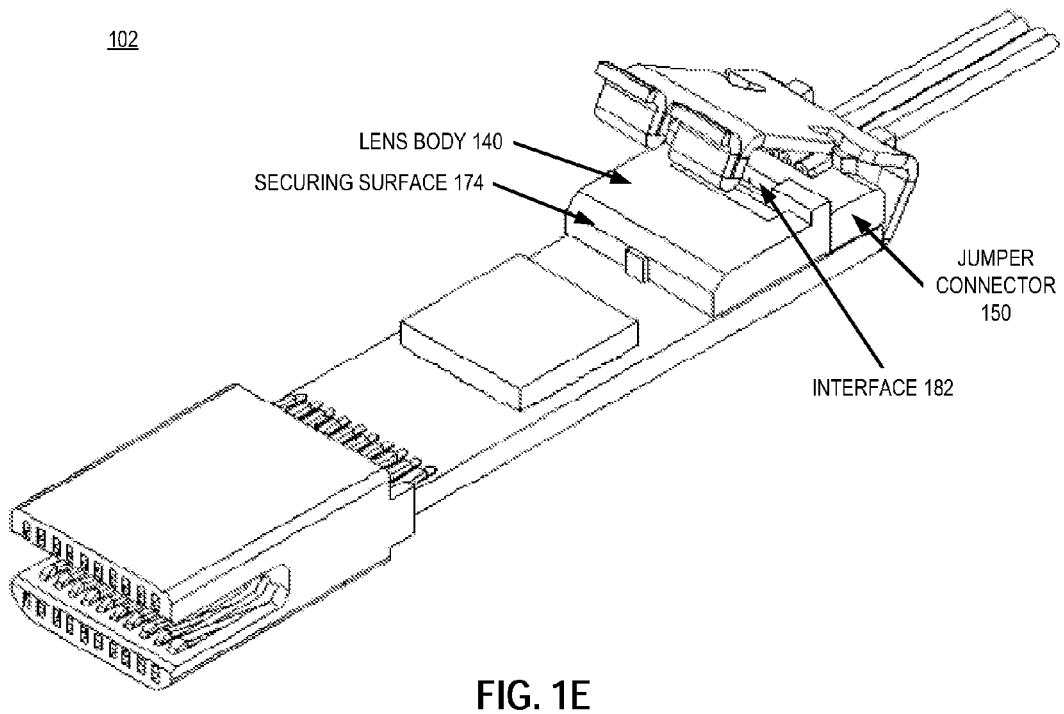
Figure 1F:
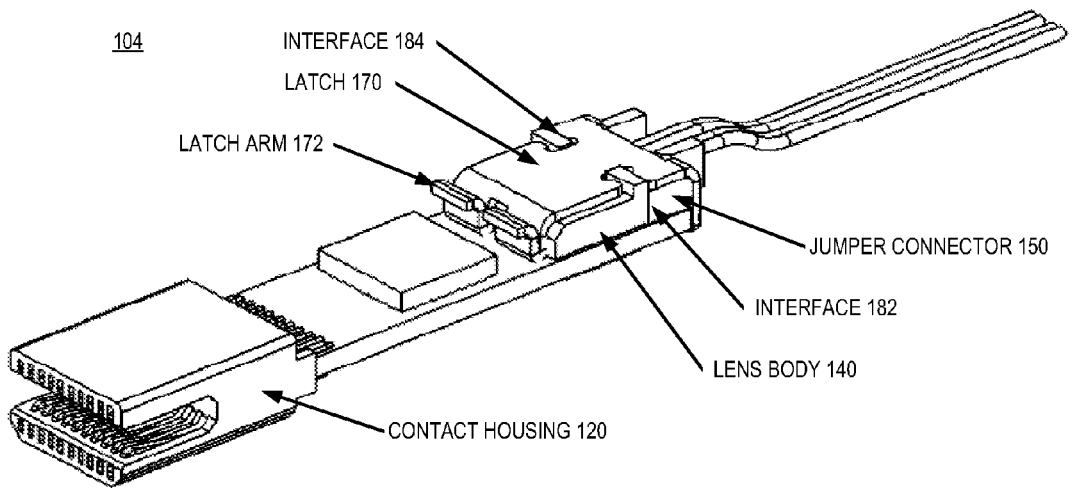

FIGS. 14-1F illustrate block diagrams of an embodiment of a plug assembly with an optical lens connector and a fiber jumper connector having c-shaped planar interface surfaces, and a latch. Each of the figures is illustrated to highlight certain aspects of the interconnection between the optical lens connector and, the fiber jumper connector. Taken in series, FIGS. 1A-1F illustrate the process of interconnecting the two connectors into a single assembly. The elements of FIGS. 1A-1F are numbered consistently throughout. Not all features illustrated are identified by reference numeral in every figure. Where a described feature is not identified in the described figure, it will be understood to be the portion of the described figure that shows the corresponding feature of a figure where the feature is specifically identified by reference numeral.

Referring to FIG. 1A, printed circuit board assembly (PCBA) 110 is a PCB with traces, contacts, potentially through-hole vias, circuit components, and mounted structures, as is known in the art. PCBA 110 includes integrated circuit (I/C) 130 mounted on it. I/C 130 is a processor that performs logic operations related to signals and signal processing. In particular, I/C 130 performs processing related to signals exchanged between the electrical contacts and the optical fiber(s). Electrical signals are exchanged (received, and/or transmitted) over electrical contacts in contact housing 120. Optical signals are exchanged (received and/or transmitted) through fiber(s) 160.

Lens body 140 includes an optical lens (shown and discussed below with respect to FIG. 1B). Optical signals are exchanged from fiber(s) 160 through corresponding optical lens(es), and converted to electrical signals which are processed by I/C 130. For electrical signals received at contact housing 120, I/C 130 processes the electrical signals and, sends signals to an optical signal converter that outputs optical signals through lens body 140 to fiber 160. Conversely, for optical signals received over fiber 160, lens body 140 focuses the optical signals on receptors that convert the light to electrical signals. In turn the electrical signals are processed and transmitted through the electrical contacts of contact housing 120.

It will be understood that processing can refer to any sort of logical operations on a signal. In particular, the timing and format of the signal, packetization, or other elements of a communication standard, differ between optical and electrical signals. Many electrical signals include a signal bus, where multiple bits can be transmitted in parallel, whereas optical signals are typically serial. Even in the case of a serial electrical communication, the packet or elemental communication package will generally be different between optical and, electrical signals. Thus, I/C 130 converts the signals by mapping a signal of one protocol or communication standard to that corresponding to a different protocol or communication standard.

It will be understood that different processing may be required to support different communication standards. In one embodiment, I/C 130 is specific to a particular electrical standard (e.g., MDP, USB). The communication standard corresponds to the pinout of the contacts in contact housing 120. In one embodiment, I/C 130 is a reusable component that can be put on PCBAs of multiple different connector types. Thus, I/C 130 can be programmed for different connector types. I/C 130 can be any type of field programmable gate array (FPGA), microcontroller, microprocessor, or other processing logic device.

In one embodiment, lens body 140 includes TIR (total internal reflection) surface 144. It is understood by those skilled in the optical arts that when an optical signal passes through one face of a lens, and an adjacent surface in the direction of propagation of the optical signal is angled, the light will be at least partially reflected. When the angle of the adjacent surface is sufficiently steep, there will be total internal reflection, meaning no light from the optical will pass through the adjacent surface, but will all be reflected internally in the body of material of which the lens surface is a part. As is understood in the art, the steepness of the angle depends on the material the lens body is made from, the material on the other side of the adjacent surface (e.g., air versus some other material abutted or manufactured onto the outside of the adjacent surface), and the frequency of the optical signal.

TIR 144 reflects or redirects an optical signal passing through the lens down toward the top surface of PCBA 110 (considering the exposed surface pointed to in FIG. 1A to be the "top" surface of the PCB). As is understood by those skilled in the art, an optical coupling mechanism disposed on the top surface of PCBA 110 receives the light and generates electrical signals responsive to the optical signal. The electrical signals are processed by I/C 130 as discussed above. For signals transmitted to fiber 160, the light is generated responsive to electrical signals produced by I/C 130, reflected by TIR 144, and passed through the optical lens to fiber 160.

Lens body 140 includes alignment stubs 142, which can be described in a number of different ways. One way to describe alignment stubs 142 is as parts or portions of lens body 140 that extend out from the perimeter of the body. Another way is to describe alignment stubs 142 as stub portions attached to the perimeter or outer surface of lens body 140. In one embodiment, the alignment stub features could be included on the jumper connector, rather than the optical lens connector, and the discussion below could be reversed.

Alignment stubs 142 extend away from the plane of a surface of lens body 140 that includes the optical lens. In one embodiment, each alignment stub has a generally rectangular cross section. It will be understood that the addition of rounding or beveling of corners could be implemented without changing the principles of the alignment features. Alignment stubs 142 are generally C-shaped. In one embodiment, each alignment stub 142 has a side surface that is coplanar with or shares a surface with a side wall of lens body 140, in one embodiment, the extension of the stubs from lens body 140 is of a spacing that creates a desired stop spacing between the optical fiber and the optical lens. For example, a certain spacing may be desired to properly focus the light between the lens and the fiber.

In one embodiment, the open sides of the C-shapes face each other, as shown. However, the orientation of the C-shape (i.e., which direction the openings in the stubs point) can be any direction. Simplicity in manufacturing would recommend squaring off the stubs along the four planes of the generally rectangular shape of the lens body, with the opening pointing up, down, left, or right with respect to the lens body and the PCB. The openings of the stubs could face the same direction, or face different directions. Having the openings face each other as shown may offer an advantage to compress and hold the alignment of the optical lens.

Jumper connector 150 includes mating or corresponding alignment structures stop surfaces 152 that interface mechanically or fit together with alignment stubs 142. As stated above, the structure could also be reversed in that jumper connector 150 could include alignment stubs that extend out from a body of the connector, and lens body 140 would then have corresponding stop surfaces.

Stop surfaces 152 could also be referred to as stubs, and fit within the empty space surrounded by the C-shape of alignment stubs 142. Stop surfaces 152 thus fit adjacent with or abut with alignment stubs 142. It will be understood that alignment stubs 142 and stop surfaces 152 interface on more than one surface. Each of the interfacing surfaces is flat or planar, unlike traditional posts and holes. Additionally, stop surfaces 152 are not surrounded on all sides by corresponding alignment stubs 142. Thus, at least one surface of each stop surface 152 does not interface with a surface of the mating alignment stub 142.

Jumper connector 150 includes a front surface between stop surfaces 152, which includes one or more through holes 154, one for each optical fiber 160 of jumper connector 150. In one embodiment, each fiber 160 includes a waveguide to transfer an optical signal and a sheath that covers the waveguide, and the sheath is stripped to expose a portion of the waveguide, which is clean-sheared and inserted into through hole 154. The front face or front surface allows each fiber (internal to jumper connector 150) to be positioned against the surface of jumper connector 150 right behind an associated through hole 154. In one embodiment, stop surfaces 152 are of a depth or length to position the front face with the through holes close to the face or surface of lens body 140 that includes the optical lens. The front face of jumper connector 150 may be spaced closely without touching the optical lens surface of lens connector 140, and the fiber (via through hole 154) is aligned with the optical lens by alignment structures 152 and alignment stubs 142. In one embodiment, the front face of connector 150 abuts the face or surface of lens body 140 that includes the optical lens, and the fiber (via through hole 154) is aligned with the optical lens by alignment structures 152 and alignment stubs 142.

As discussed above, the alignment features (the stubs) do not interface around the entire perimeter of the protruding structure (the stop surfaces). The alignment features would interface on three sides, as well as the stop surfaces interfacing against the lens body in the space surrounded by the C-shape.

In one embodiment, latch 170 slides over jumper connector 150 and lens body 140 to secure the interface between the two connector components. In one embodiment, latch 170 is a sheet metal latch. The latch provides additional mechanical support to achieve excellent control on optical coupling. In one embodiment, latch 170 is said to lock the two connectors together. Thus, in one embodiment, the combination of passive alignment structures and connector locking provides alignment and stability for optical interfacing.

Referring to FIG. 1B, the assembly is shown from a different perspective. The drawing identifies PCBA 110 and contact housing 120. Again, lens body 140 is disposed on PCBA 110 near I/C 130 (not identified by number on FIG. 1B). Alignment stubs 142 protrude or extend from a portion of lens body 140, and provide interfacing with mating alignment features of jumper connector 150.

As discussed above with respect to FIG. 1A, lens body 140 includes a lens surface, shown as lens surface 146, which includes one or more optical lenses 148 on the surface. Lens surface 146 is adjacent TIR surface 144, and optical signals from fiber 160 passing through optical lens 148 reflect off of TIR, surface 144. Similarly, signals can be redirected off TIR surface 144 through optical lens 148 will be directed to fiber 160 when jumper connector 150 is interfaced with lens body 140 (an optical lens connector).

It will be understood that lens surface 146 is a generally planar surface, within a plane being orthogonal to a line of focus of the light propagation through optical lens 148. The alignment structures passively align optical fiber 160 of jumper connector 150 to optical lens 148, and to restrict lateral and vertical motion of the jumper connector when interfaced with the optical lens connector.

From the perspective in FIG. 1B, it will be understood how lower portion 176 of latch 170 fits against the bottom of the back of jumper connector 150, below fiber 160. Referring to FIG. 1C, latch 170 is shown positioned with lower portion 176 against the back of jumper connector 150, under the fiber. Latch arm 172 is to be brought down to securing surface 174 to hold latch 170 in place. When latch 170 is secured in place, it holds jumper connector 150 to the optical lens connector on PCBA 110. The optical lens connector is understood to include the lens body, and surface that includes the lens, as well as the alignment features (arms as illustrated, or spaces in an alternative embodiment).

In one embodiment, latch 170 includes latch gaps 174, which interface with corresponding stub flanges 176 on alignment stubs 142 of the lens connector. Stub flange 176 protrudes above the top surface of lens body 140. In one embodiment, one portion of the C-shape of alignment stubs is coplanar with the bottom of lens body 140, another portion is coplanar with a side surface of lens body 140, and the other portion is higher than the plane of the top surface of lens body 140. Thus, C-shaped alignment stubs protrude through latch gaps 174, providing one more component for alignment and securing strength.

Referring to FIG. 1D, the figure shows a different perspective of latch 170 positioned against the back of jumper connector 150, under fiber 160. Again, latch arm 172 secures against securing surface 174 of lens body 140. In one embodiment, lens body 140 is glued or epoxied onto PCBA 110, which is or includes a substrate such as FR4. Lens body 140 can be secured to PCBA 110 through another means such as a mechanical connector, a latch, solder, or other mechanism. In one embodiment, fiber 160 is glued to jumper connector 150. In an alternate embodiment, fiber 160 can be secured to jumper connector 160 through other means, such as with a securing cap that fits onto the body of jumper connector 150.

To engage jumper connector 150 to lens body 140, latch 170 is passed over jumper connector 150, as seen in FIG. 1D. Referring now to FIG. 1E, cable assembly 102 includes jumper connector 150, which has stop surfaces that slide into C-shaped alignment stubs 142 of lens body 140. While jumper connector 150 moves toward the optical surfaces of lens body 140, the alignment arms of lens body 140 perform optical alignment (passively) between optical lens 148 and corresponding fiber 160.

In one embodiment, securing surface 174 of lens body 140 includes notches on its surface to receive latch 170. The notches can help in mechanically securing the jumper connector to the optical lens connector. The notches can enable better alignment of latch 170 over lens body 140, and better securing.

Interface 182 illustrates the resulting interface between lens body 140 and jumper connector 150 as a result of alignment stubs 142 and stop surfaces 152. It will be understood that in one embodiment, the front face of jumper connector 150 (that includes the through holes) abuts the lens surface of lens body 140. In one embodiment, there is a gap (as shown) between the stop surface of jumper connector 150 and the lens surface of lens body 140. In either case, the stop surface of jumper connector 150 could be considered adjacent or next to the optical lens surface of lens body 140. The gap or lack of gap will depend on a designed focal point. The end surface of the alignment arms stop the jumper connector at the designed focal point.

Referring to FIG. 1F, cable assembly 104 is the same as cable assembly 102, with latch 170 engaged with lens body 140 via latch arm 172. Thus, latch 170 secures jumper connector 150 to lens body 140, and secures interface 182 with interface 184. Interface 184 illustrates the interface between latch 170 and the flanges of the C-shaped alignment features. The interfaces being "secured" refers to the locking of the interfacing features, which then holds the connector components together, and ensures the alignment provided by the alignment features on the connectors is maintained through use of cable assembly 104.

Figure 2:
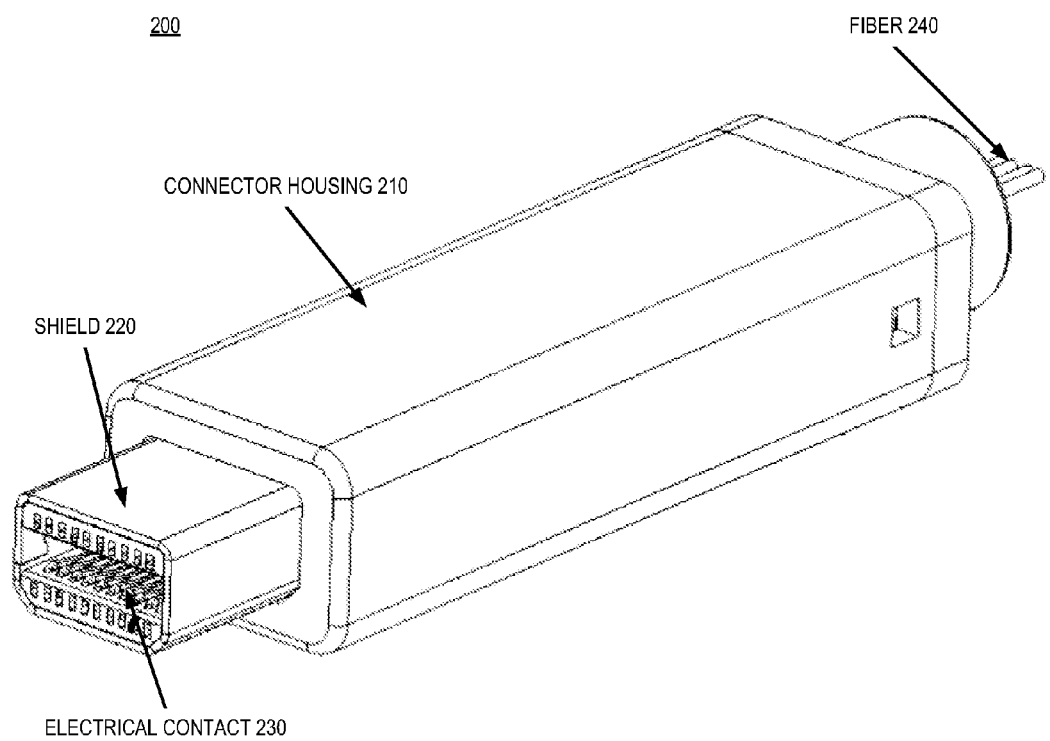
FIG. 2 is a block diagram of an embodiment of an active plug assembly having optical components to interface with an electrical contact housing.

FIG. 2 is a block diagram of an embodiment of an active plug assembly having optical components to interface with an electrical contact housing. Assembly 200 can be referred to as an active optical cable (AOC) assembly. Assembly illustrated an embodiment of cable assembly 104 of FIG. 1F with housing and shielding.

More particularly, connector housing 210 surrounds and encloses the cable assembly, including the interface connectors and the active elements of the cable assembly. Shield 220 covers contact housing, which provide electrical contacts 230. Electrical contacts 230 are the means through which electrical signals are exchanged with a device that connects to assembly 200. Fiber 240 is the means by which the signals, as optical signals, are passed through the cable.

Thus, a cable can interface with a device via electrical signals, and transfer signals to another device via optical signals. The other end of the cable can be natively optical, or natively electrical. For a natively optical cable interface at the other end, the optical signals would simply be transferred to/from another connector or another device in optical form. For an electrically native interface at the other end of fiber 240, there will be a similar active optical cable assembly to convert the optical signals to electrical signals to transfer over electrical contacts.

As mentioned above, with assembly 200, there are active elements inside the plug head (assembly 200) such as laser diode, photo diode, and control I/C. The control I/C refers to I/C 130 of FIGS. 1A-1F. Laser diodes and photo diodes can be used to convert signals between optical and electrical (i.e., a laser diode to generate an optical signal from an electrical signal, and a photo diode to generate electrical signals from optical signals). To convey light from one side of AOC assembly 200 to the other side, a lens body (e.g., lens body 140 above) is utilized to focus the light from a laser diode at the transmit side onto a fiber (e.g., fiber 160 above) in a jumper connector (e.g., connector 150 above), and to focus the light from the fiber onto the photo diode at the receiving side. The fiber and the optical lens are aligned via C-shaped alignment structures. In one embodiment, a latch (e.g., latch 170 above) is used to keep the lens body and jumper connector together to maintain good optical coupling.

While reference is made above to specific embodiments illustrated, a more general discussion follows without specific reference to figures. It will be understood that the flat or planar surfaces described have advantages over the traditional use of holes and pins. The manufacture and/or machining of the posts or pins resulted in undesirable variations due to the difficulty of maintaining tolerance of size and position. Additionally, rounded components introduced the difficulty of tapering, which introduces another dimension of tolerance that must be kept. In contrast, the described embodiments use flat surfaces. With such surfaces, there is only dimensional tolerance to deal with, rather than dimension, position, and possibly tapering. Thus, potentially multiple dimensions of tolerance can be eliminated.

As used herein, line of focus and direction of propagation refer to a direction that an optical signal is generally propagated when transferred. Line of focus can refer to a hypothetical line that would extend through and out both directions of the lens based on the focus of the lens. For example, a direction of propagation of an optical signal through a fiber is down the length of the fiber, and orthogonal to a cross section circle of the fiber. A direction of propagation with reference to an optical lens refers to how light generally passes through the lens. With reference to a lens, the direction of propagation can also be referred to as a line of focus, referring to the focusing of the optical signal by the lens. The line of focus is generally orthogonal to a lens surface on which an optical lens is disposed.

It will be understood that the alignment arms restrict vertical and horizontal motion of the jumper connector with respect to the optical connector. Thus, considering the optical connector to have top and bottom surfaces corresponding to a surface facing away from (the top) a PCB on which it is mounted and a surface facing towards (the bottom) the PCB, restriction of vertical motion refers to restricting a plane of the jumper connector body from tilting with respect to a plane of the optical connector (the planes formed by the top and bottom surfaces). Considering the optical connector to have side surfaces corresponding to surfaces substantially orthogonal or at right angles or perpendicular to the PCB, restriction of horizontal motion refers to restricting angular rotation of the jumper connector within the planes formed by the top and bottom surfaces.

As mentioned above, in one embodiment, the alignment arms are considered to form part of the surfaces of the lens body. In another embodiment, they are considered to be portions separate from the surfaces of the lens body, but still coplanar with one or more surfaces of the lens body. The alignment arms can have a side surface that is shared with the lens body, or is coplanar with a side surface of the lens body. In one embodiment, the alignment arms each have a surface coplanar with opposite sides of the lens body, and both have a surface coplanar with the bottom surface of the lens body (e.g., abutting the PCB). In such an embodiment, a tongue alignment feature could be included that is coplanar on one surface with the top surface of the lens body. Whatever the configuration, in one embodiment the lens connector includes alignment arms that face up and down (e.g., an alignment arm having a gap between its top surface and the top surface of the lens body, and an alignment arm having a gap between its bottom surface and the bottom surface of the lens body, respectively).

An optical lens is referred to above with respect to the lens body. It will be understood that a lens can be constructed of any appropriate material, which can include plastic, glass, silicon, or other materials that can be shaped and provide optical focusing. The lens body can include multiple materials, with at least an optical surface being of an appropriate material to direct or redirect light propagation.

Currently, plastic lenses are a common choice, seeing they provide convenience in cost, manufacturing, and durability. In one embodiment, the optical lens is designed to support expanded-beam optical interfacing. In an expanded-beam approach, the optical lens expands and collimates transmit signals, and focuses received signals. As is understood by those skilled in the art, collimating refers to making the photons of the light signal more parallel in reception.

An AOC assembly can be used with plugs or receptacles (into which plugs are inserted). Plugs and receptacles find common use to connect peripheral devices (which can be any of the same types of devices discussed above) with a host device. A plug can be built directly into a peripheral device (with or without a cord), or can be interconnected to another device via a standalone cable. The standalone cable includes plugs and/or receptacles that can include an AOC assembly as described above.

Discussion herein of mating one connector with another refers to providing a mechanical and communicative connection. The mating of one connector with another typically also provides a communication connection. The mating of the connectors occurs via the housing and alignment features, and typically includes contact of the electrical contacts and/or alignment of fiber optical signal transmission elements.

The various assemblies described herein could each also be referred to as a "subassembly." A technical distinction could be drawn between an assembly and a subassembly. For example, an assembly could refer to a "finished" product, or a finished system or subsystem of a manufactured item, while a subassembly could refer to a combination of components to be combined other components or another subassembly to complete an assembly. However, a subassembly is not distinguished from an "assembly" herein, and use of the different terms is solely for convenience in description. Reference to an assembly can refer to what can otherwise be considered a subassembly, and both refer to an integration or combination of components.

The electrical protocols or standards that can be used could include universal serial bus (USB) (standard or mini), high-definition multimedia interface (HDMI), DisplayPort (including MiniDisplayPort (MDP)). It will be understood that each different standard can include a different configuration or pinout for the electrical contact assembly. Additionally, the size, shape and configuration of the contact housing are dependent on the standard, including tolerances for the mating of the corresponding connectors. Thus, the layout of a connector may be different for the various standards. As will be understood by those of skill in the art, optical interfaces require line-of-sight connections to have an optical signal transmitter interface with a receiver (such as a lens and a fiber, or two lenses).

Figure 3:
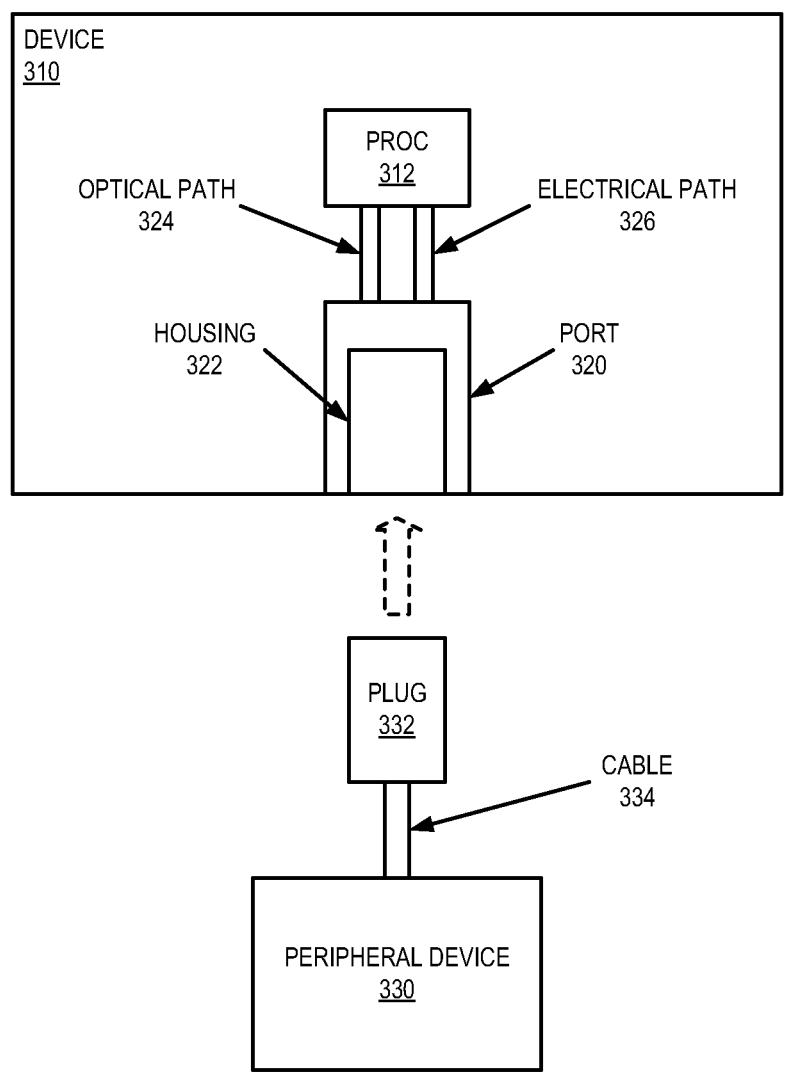
FIG. 3 is a block diagram of an embodiment of a system in which an active optical cable assembly could be used.

FIG. 3 is a block diagram of an embodiment of a system in which an active optical cable assembly could be used. System 300 includes device 310, which can include any of a number of devices, including a desktop or laptop computer, a netbook, a tablet computing device, or other such device. Besides computing devices, it will be understood that many other types of electronic devices can incorporate the one or more of the types of connector discussed herein, and the embodiments described herein would apply equally well in such electronic devices. Examples of other such electronic devices can include handheld devices, smartphones, media devices, multimedia devices, memory devices, cameras, voice recorders, I/O devices, networking devices, gaming devices, gaming consoles, or any other electronic device that might include such a connector.

Device 310 includes processor (proc) 312, which represents any type of processing component that processes electrical and/or optical signals I/O signals. Processor 312 is an abstraction, and it will be understood that a single processing device could be used, including a multi-core device, or multiple separate devices can be used. Processor 312 can include or be a microprocessor, programmable logic device or array, microcontroller, signal processor, or some combination.

Device 310 includes port 320, which interfaces with plug 332. Plug 332 is a connector plug that allows peripheral device 330 (which can be any of the same types of devices discussed above) to interconnect with device 310. Plug 332 can be directly build into peripheral device 330 (with or without a cord), or can be interconnected to peripheral device 330 via a standalone cable. In one embodiment, plug 332 supports communication via an optical interface, an electrical interface, or both.

Plug 332 mates with port 320 of device 310. As used herein, mating one connector with another refers to providing a mechanical connection. The mating of one connector with another typically also provides a communication connection. Port 320 includes housing 322, which provides the mechanical connection mechanisms. In one embodiment, port 320 includes electrical and optical interface components. In one embodiment, port 320 only supports an electrical interface.

In an embodiment where optical interfacing is supported in device 310, device 310 includes optical path 324. Optical path 324 represents one or more components, which can include processing and/or termination components that convey an optical signal between processor 312 and port 320. Conveying a signal can include the generation and converting to optical, or the receiving and converting to electrical, as described in more detail below. In an embodiment where electrical interfacing from port 320 is supported in device 310, device 310 includes electrical path 326. Electrical path 326 represents one or more components that convey an electrical signal between processor 312 and port 320.

It will be understood that while a portion of optical path 324 can include electrical components (especially for converting to/from electrical for processor 312), optical path 324 conveys a signal that is either received at or sent from device 310 as an optical signal. In contrast, electrical path 326 conveys a signal that is either received at or sent from device 310 as an electrical signal. Thus, optical path 324 provides a communication path for port 320 as an optical interface, and electrical path 326 provides a communication path for port 320 as an electrical interface.

Port 320, housing 322, and optical and electrical paths (324 and 326, respectively) support the connector embodiments described above. In one embodiment, plug 332 includes an active optical connector (AOC) assembly, such as described above. As described above, the AOC assembly includes interfaces between an optical connector including an optical lens, and a jumper connector including an optical fiber. The interfacing between the connectors is accomplished with flat-surface interconnect and C-shaped alignment features. In one embodiment, a latch enhances the mechanical connection between the connectors.

In one embodiment, device 310 supports only electrical interfacing at port 320. Thus, plug 332 can convert from electrical interfacing with electrical contacts to an optical signal to be transferred over cable 334. Peripheral device 330 can then convert between optical and electrical to receive and transmit signals over cable 334.

Figure 4:
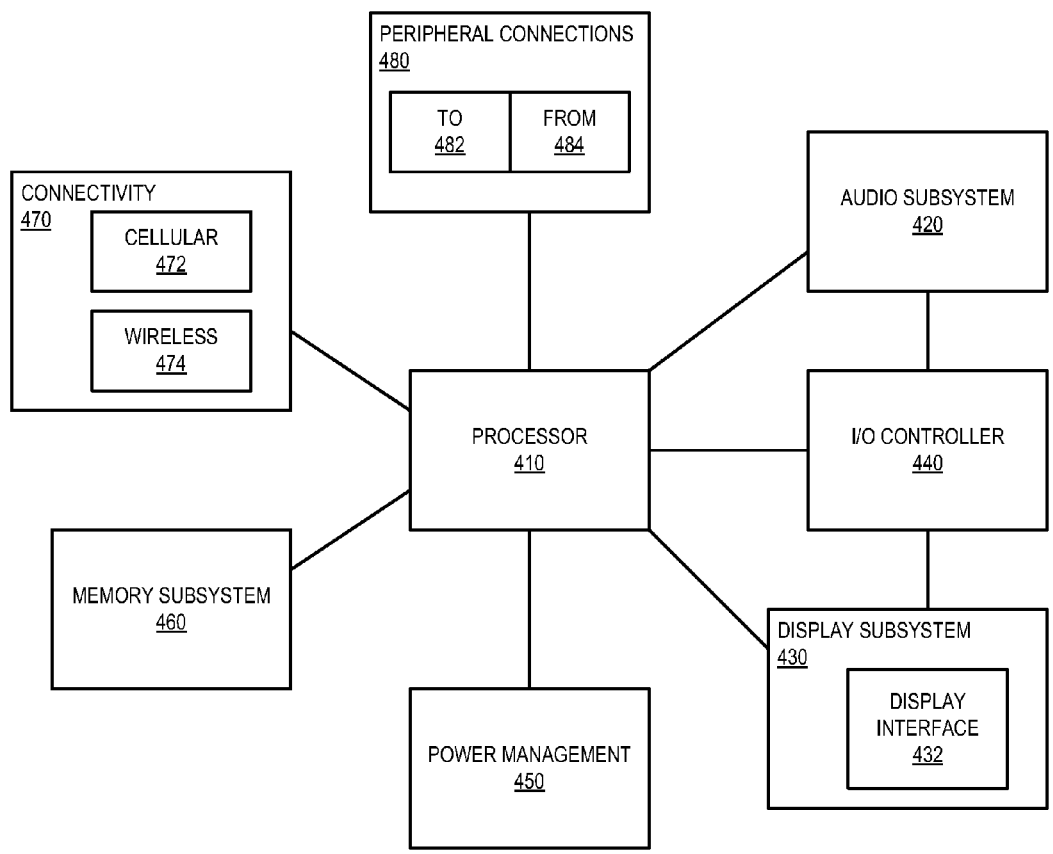
FIG. 4 is a block diagram of an embodiment of a mobile device in which flat surface interface connectors could be used.

FIG. 4 is a block diagram of an embodiment of a mobile device in which flat surface interface connectors could be used. Computing device 400 represents a mobile computing device, such as a computing tablet, a mobile phone or smartphone, a wireless-enabled e-reader, or other wireless mobile device. It will be understood that certain of the components are shown generally, and not all components of such a device are shown in device 400.

Device 400 includes processor 410, which performs the primary processing operations of device 400. Processor 410 can include one or more physical devices, such as microprocessors, application processors, microcontrollers, programmable logic devices, or other processing means. The processing operations performed by processor 410 include the execution of an operating platform or operating system on which applications and/or device functions are executed. The processing operations include operations related to I/O (input/output) with a human user or with other devices, operations related to power management, and/or operations related to connecting device 400 to another device. The processing operations may also include operations related to audio I/O and/or display I/O.

In one embodiment, device 400 includes audio subsystem 420, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 400, or connected to device 400. In one embodiment, a user interacts with device 400 by providing audio commands that are received and processed by processor 410.

Display subsystem 430 represents hardware (e.g., display devices) and software (e.g., drivers) components that provide a visual and/or tactile display for a user to interact with the computing device. Display subsystem 430 includes display interface 432, which includes the particular screen or hardware device used to provide a display to a user. In one embodiment, display interface 432 includes logic separate from processor 410 to perform at least some processing related to the display. In one embodiment, display subsystem 430 includes a touchscreen device that provides both output and input to a user.

I/O controller 440 represents hardware devices and software components related to interaction with a user. I/O controller 440 can operate to manage hardware that is part of audio subsystem 420 and/or display subsystem 430. Additionally, I/O controller 440 illustrates a connection point for additional devices that connect to device 400 through which a user might interact with the system. For example, devices that can be attached to device 400 might include microphone devices, speaker or stereo systems, video systems or other display device, keyboard or keypad devices, or other I/O devices for use with specific applications such as card readers or other devices.

As mentioned above, I/O controller 440 can interact with audio subsystem 420 and/or display subsystem 430. For example, input through a microphone or other audio device can provide input or commands for one or more applications or functions of device 400. Additionally, audio output can be provided instead of or in addition to display output. In another example, if display subsystem includes a touchscreen, the display device also acts as an input device, which can be at least partially managed by I/O controller 440. There can also be additional buttons or switches on device 400 to provide I/O functions managed by I/O controller 440.

In one embodiment, I/O controller 440 manages devices such as accelerometers, cameras, light sensors or other environmental sensors, or other hardware that can be included in device 400. The input can be part of direct user interaction, as well as providing environmental input to the system to influence its operations (such as filtering for noise, adjusting displays for brightness detection, applying a flash for a camera, or other features).

In one embodiment, device 400 includes power management 450 that manages battery power usage, charging of the battery, and features related to power saving operation. Memory subsystem 460 includes memory devices for storing information in device 400. Memory can include nonvolatile (state does not change if power to the memory device is interrupted) and/or volatile (state is indeterminate if power to the memory device is interrupted) memory devices. Memory 460 can store application data, user data, music, photos, documents, or other data, as well as system data (whether long-term or temporary) related to the execution of the applications and functions of system 400.

Connectivity 470 includes hardware devices (e.g., wireless and/or wired connectors and communication hardware) and software components (e.g., drivers, protocol stacks) to enable device 400 to communicate with external devices. The device could be separate devices, such as other computing devices, wireless access points or base stations, as well as peripherals such as headsets, printers, or other devices.

Connectivity 470 can include multiple different types of connectivity. To generalize, device 400 is illustrated with cellular connectivity 472 and wireless connectivity 474. Cellular connectivity 472 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 474 refers to wireless connectivity that is not cellular, and can include personal area networks (such as Bluetooth), local area networks (such as WiFi), and/or wide area networks (such as WiMax), or other wireless communication.

Peripheral connections 480 include hardware interfaces and connectors, as well as software components (e.g., drivers, protocol stacks) to make peripheral connections. It will be understood that device 400 could both be a peripheral device ("to" 482) to other computing devices, as well as have peripheral devices ("from" 484) connected to it. Device 400 commonly has a "docking" connector connect to other computing devices for purposes such as managing (e.g., downloading and/or uploading, changing, synchronizing) content on device 400. Additionally, a docking connector can allow device 400 to connect to certain peripherals that allow device 400 to control content output, for example, to audiovisual or other systems.

In addition to a proprietary docking connector or other proprietary connection hardware, device 400 can make peripheral connections 480 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, one or more peripheral connections are established via optical interconnections. When an optical interconnection is used, an optical plug and receptacle can be used. In one embodiment, as described above, the connectors can have flat surfaces with C-shaped features to passively align the optical interconnection. A latch can further support the interconnection.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An optical lens connector comprising:
a lens body having disposed on the body an optical lens through which to exchange optical signals, wherein a substantially flat surface of the lens body includes a first substantially rectangular space and a second substantially rectangular space on opposite sides of a line of focus of the optical lens, a plane of the substantially flat surface being orthogonal to the line of focus, wherein the lens body forms C-shaped alignment structures adjoining a perimeter of the substantially flat surface of the lens body, the C-shaped alignment structures including:
a first C-shaped alignment structure including first substantially planar surfaces surrounding only three sides of the first substantially rectangular space; and
a second C-shaped alignment structure including second substantially planar surfaces surrounding only three sides of the second substantially rectangular space;
wherein respective open sides of the first substantially rectangular space and the second substantially rectangular space face each other in the plane, the first substantially rectangular space and the second substantially rectangular space to mechanically interface each with a different respective mating stop surface of a jumper connector that is to interface an optical fiber with the optical lens, the alignment structures to passively align the optical fiber of the jumper connector to the optical lens, and to restrict lateral and vertical motion of the jumper connector when interfaced with the optical lens connector.

2. The optical lens connector of claim 1, wherein the C-shaped alignment structures extend out from the lens body a distance that creates a spacing between the optical fiber and the optical lens.

3. The optical lens connector of claim 1, wherein the lens body includes a total internal reflection (TIR) surface adjacent the optical lens to couple the optical signals between an optical integrated circuit and the optical lens.

4. The optical lens connector of claim 1, wherein the lens body further comprises:
notches on a surface to receive a latch to mechanically secure the jumper connector to the optical lens connector.

5. The optical lens connector of claim 1, wherein each of the first alignment structure and the second alignment structure further comprises:
a flange that extends above a top surface of the lens body, where the top surface is a surface opposite a surface of the lens body to be mounted on a connector assembly substrate.

6. The optical lens connector of claim 1, further comprising:
a printed circuit board (PCB) on which the lens body is disposed, the optical lens to exchange optical signals with an optical-electrical circuit that converts between optical and electrical signals; and
an electrical contact housing disposed on the PCB to electrically exchange signals converted by the optical-electrical circuit.

7. An optical lens connector comprising:
a body portion; and
an optical lens disposed in the body portion through which to exchange optical signals, wherein a substantially flat surface of the body portion includes a first substantially rectangular space and a second substantially rectangular space on opposite sides of a line of focus of the optical lens, a plane of the substantially flat surface being orthogonal to the line of focus;
wherein the body portion forms C-shaped stub portions adjoining a perimeter of the substantially flat surface of the body portion, the C-shaped stub portions including:
a first C-shaped stub portion including first substantially planar surfaces surrounding only three sides of the first substantially rectangular space; and
a second C-shaped stub portion including second substantially planar surfaces surrounding only three sides of the second substantially rectangular space;
wherein respective open sides of the first substantially rectangular space and the second substantially rectangular space face each other in the plane, the first substantially rectangular space and the second substantially rectangular space to mechanically interface each with a different respective mating stop surface of a jumper connector that is to interface an optical fiber with the optical lens, the C-shaped stub portions to passively align the optical fiber of the jumper connector to the optical lens, and to restrict lateral and vertical motion of the jumper connector when interfaced with the optical lens connector.

8. The optical lens connector of claim 7, wherein the C-shaped stub portions extend out from the body portion a distance that creates a spacing between the optical fiber and the optical lens.

9. The optical lens connector of claim 7, wherein the body portion includes a total internal reflection (TIR) surface adjacent the optical lens to couple the optical signals between an optical integrated circuit and the optical lens.

10. The optical lens connector of claim 7, wherein the body portion further comprises:
notches on a surface opposite the surface on which the optical lens is disposed to receive a latch to mechanically secure the jumper connector to the optical lens connector.

11. The optical lens connector of claim 10, wherein each of the first C-shaped stub portion and the second C-shaped stub portion further comprises:
a flange that extends above a top surface of the body portion, where the top surface is a surface opposite a surface of the body portion to be mounted on a connector assembly substrate.

12. The optical lens connector of claim 7, further comprising:
a printed circuit board (PCB) on which the body portion is disposed, the optical lens to exchange optical signals with an optical-electrical circuit on the PCB that converts between optical and electrical signals; and an electrical contact housing disposed on the PCB to electrically exchange signals converted by the optical-electrical circuit.

13. An optical lens assembly comprising:
a printed circuit board (PCB) having an electrical contact housing to electrically exchange signals with a mating contact device;
a jumper connector having an optical fiber to exchange an optical signal with an optical lens;
an optical lens connector including;
 a lens body having disposed on the body the optical lens through which to exchange optical signals, wherein a substantially flat surface of the lens body includes a first substantially rectangular space and a second substantially rectangular space on opposite sides of a line of focus of the optical lens, a plane of the substantially flat surface being orthogonal to the line of focus, wherein the lens body forms C-shaped alignment structures adjoining a perimeter of the substantially flat surface of the lens body, the C-shaped alignment structures including:
  a first C-shaped alignment structure including first substantially planar surfaces surrounding only three sides of the first substantially rectangular space; and
  a second C-shaped alignment structure including second substantially planar surfaces surrounding only three sides of the second substantially rectangular space;
 wherein respective open sides of the first substantially rectangular space and the second substantially rectangular space face each other in the plane, the first substantially rectangular space and the second substantially rectangular space to mechanically interface each with a different respective mating stop surface of the jumper connector, the alignment structures to passively align the optical fiber of the jumper connector to the optical lens, and to restrict lateral and vertical motion of the jumper connector when interfaced with the optical lens connector; and
 a latch to mechanically secure the optical lens connector to the jumper connector.

14. The optical lens assembly of claim 13, wherein the C-shaped alignment structures extend out from the lens body a distance that creates a desired spacing between the optical fiber and the optical lens.

15. The optical lens assembly of claim 13, wherein the lens body includes a total internal reflection (TIR) surface adjacent the optical lens to couple the optical signals between an optical integrated circuit and the optical lens.

16. The optical lens assembly of claim 13, wherein the lens body further comprises:
notches on a surface to receive the latch to mechanically secure the jumper connector to the optical lens connector.

17. The optical lens assembly of claim 16, wherein each of the first alignment structure and the second alignment structure further comprises:
a flange that extends above a top surface of the lens body, where the top surface is a surface opposite a surface of the lens body to be mounted on the PCB.

* * * * *